May 7, 1957  L. M. WYLIE  2,791,197

SAFETY INDICATOR FOR FLUID LEVEL

Filed July 1, 1955

INVENTOR.
Lena M. Wylie
BY Reginald W. Hoagland
ATTORNEY

2,791,197
SAFETY INDICATOR FOR FLUID LEVEL

Lena M. Wylie, Cayuga, Ind.

Application July 1, 1955, Serial No. 519,505

2 Claims. (Cl. 116—118)

This invention relates to indicating mechanisms that are visible from the driver's seat of a motor vehicle for determining if the quantity of oil in the crankcase of the engine is above or below a predetermined subnormal level.

Generally, there is provided, in the crankcase of an internal combustion engine, in addition to the usual engine-driven oil pump of the engine lubricating system, a second engine-driven oil pump with its oil entrance opening located approximately one quart of oil below the normal full level of oil in the crankcase, and with its outlet opening connected by a pipe line to a transparent section of the oil passageway that is mounted on the instrument panel of the vehicle. From the transparent section of the oil passageway, another pipe line returns the pumped oil to the crankcase. Thus, when the engine is running, and the oil in the crankcase is less than one quart low, oil will be circulated through said transparent section and will be visible to the operator of the vehicle. However, should the quantity of oil fall below the location of the entrance opening of oil to this second pump, oil will cease to be circulated through the visible section of the passageway, which will give a warning that additional oil is needed.

It is accordingly an object of the invention to provide a novel oil circulating system, which is entirely independent of the usual oil lubricating system for gas engines, and which will indicate when oil should be added to the crankcase of the engine.

Another object of the invention is to provide, in a device of the character outlined above, a novel system of circulating oil in the crankcase of an engine through a transparent tube on the instrument panel of a motor vehicle for visibly determining the condition of the oil.

A further object of the invention is to provide, in a device of the character set forth, a novel construction whereby an oil level indicating pump is mounted on a normal oil lubricant pump and both are driven by the same rotatable shaft connected to the engine.

It is also an object of the invention to provide a device of the above-indicated character which is simple and substantial in construction, inexpensive to manufacture and yet effective and efficient in use.

Figure 1:
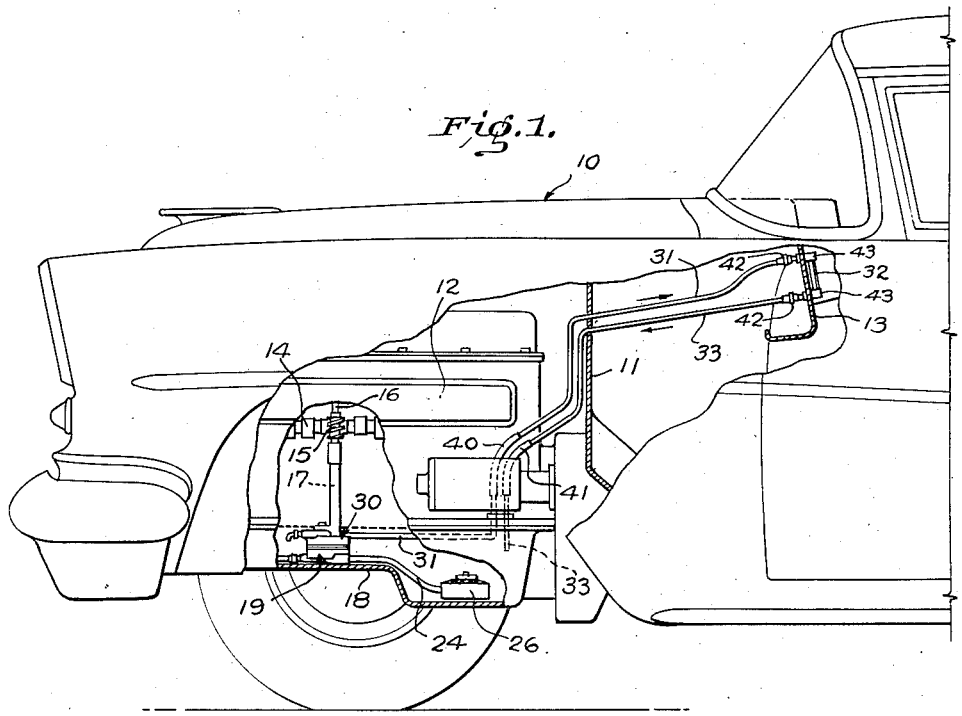
Figure 2:
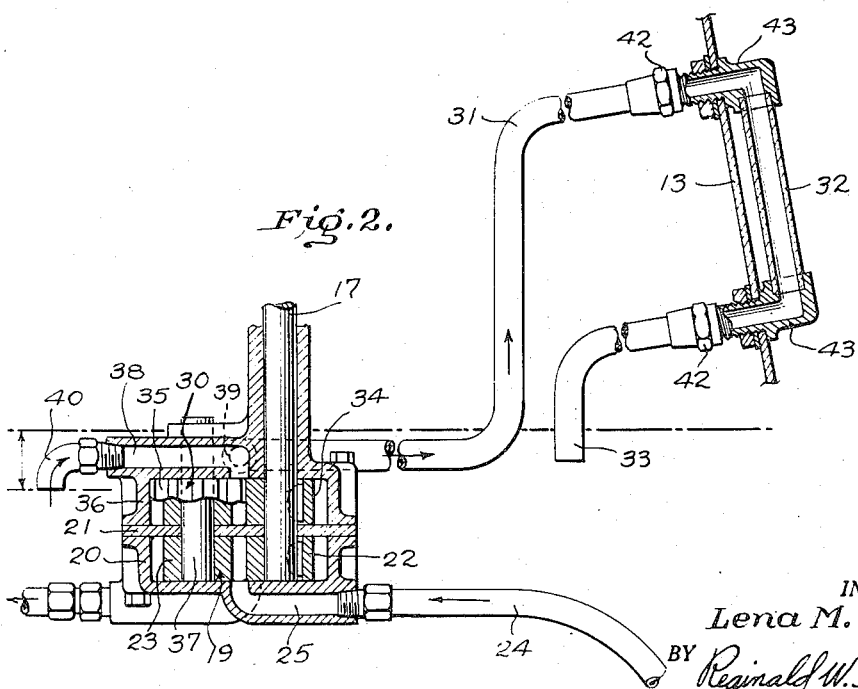

Other and further objects of the invention will become apparent from a reading of the following specification, taken in conjunction with the drawings, in which:

Figure 1 is a fragmentary side elevational view, parts being broken away, of the front portion of an automotive vehicle illustrating the manner in which the oil level indicating device of the present invention is applied thereto; and Figure 2 is an enlarged sectional view through the normal and secondary pumps and the transparent tube, and showing the pipe lines connecting same in elevation and with portions thereof broken away.

Referring now more specifically to the accompanying drawings, wherein like numerals designate similar parts throughout the various views, attention is directed first to Figure 1 wherein it will be seen that there is indicated at 10, a portion of the front of an automotive vehicle having the customary firewall 11 which divides the compartment containing the internal combustion engine 12 of the vehicle from the interior of the automobile where the instrument panel 13 is arranged. The engine 12, as shown, has a cam shaft 14 thereof connected by helical gears 15 to a distributor shaft 16, which in turn, is coupled to the upper end of a pump drive shaft 17 that extends downwardly into the crankcase 18. The oil pump 19, which lubricates the engine and which is carried at the lower end of the pump drive shaft 17, has been changed slightly, but its principle of operation and general construction remain the same, there being a two-piece housing 20 and 21 enclosing a pair of gears 22 and 23 that are driven by the shaft 17. The pump intake is also the same, and in the present instance, there is shown a tubular arm 24 connected at the pump intake opening 25 and to a floating-type pickup screen member 26 located in the sump of the crankcase 18, as best shown in Figure 2.

The improved oil level indicator forming the subject of this invention consists of an additional oil pump 30 of the same general construction as the pump 19 of the lubricating system, a pipe line 31 leading from the pump 30 to the upper end of a vertically arranged transparent tubular section 32 mounted on the instrument panel 13, and another pipe line 33 leading from the lower end of the tubular section 32 back to the interior of the crankcase. The pump 30, like the pump 19, has a pair of gears 34 and 35 housed in a casing 36 that is arranged above and bolted onto the upper piece 21 of the housing of the pump 19, thus utilizing said housing piece 21 as a separating wall between interiors of both pumps. The driveshaft 17 keyed to the gears 22 and 34, and a non-rotating shaft 37 upon which the gears 23 and 35 turn are journaled in the casing 36 and extend through openings in the housing piece 21 for rotatably mounting both gears of both pumps.

In the top wall of the casing 36 are horizontal intake and output ducts 38 and 39, respectively, and communicating with the intake duct is a ninety-degree elbow pipe fitting 40 which may be adjusted to elevate or lower the open end thereof to a position relative to the normal full level of oil in the crankcase. Connected to the output duct 39 by suitable fittings is the pipe line 31 leading to the transparent tubular section 32 through which oil circulated by the pump 30 is visible. The pipe lines 31 and 33 are preferably constructed of copper tubing and have flexible sections 40 and 41 therein for permitting movement of the engine relative to the body of the vehicle without bending said tubing. On the upper end of each of these tubes are ball sleeve fittings consisting of a nut 42 threaded on an end of an elbow 43 that extends through and is secured to the instrument panel 13. Recessed in and extending between the other and aligned ends of the elbows 43 is the transparent tubular section that joins the pipe lines 31 and 33.

In Figure 2 of the drawing, there is shown a dash-and-dot line 44 representing the level of oil in the crankcase when full, and below the line 44 is another dash-and-dot line 45 representative of the level of oil when substantially one quart low. A dimensional line 46 extending between the lines 44 and 45 indicates the depth of submerging of the intake opening to the pump 30 in a full crankcase. Thus, it can be seen that as long as the level of oil is above the intake or entrance opening to the pump 30, oil will be circulated through the transparent tube 32, but when the level of oil falls below the line 45, oil circulation will cease.

While the pump 30 of the oil level indicating system and the pump 19 of the oil lubricating system are shown as of a single unit construction, which is the most simple, economical, and efficient means of deriving power for operation of the pump 30, it is to be understood that the pump 30 may be an entirely separate unit, and its location may be any place, either in or out of the crankcase, so long as the intake or entrance opening of oil to the pump 30 is arranged slightly below and relative to the full level of oil in the crankcase.

In view of the foregoing description taken in conjunction with the accompanying drawings, it is believed that a clear understanding of the construction, operation, and advantages of the oil level indicator will be quite apparent to those skilled in this art. A more detailed description is accordingly deemed unnecessary.

It is to be understood, however, that even though there is herein shown and described a preferred embodiment of the invention, various changes may be made without departing from the spirit and full intendment of the invention.

What is claimed is:

1. An oil circulating system for indicating when oil in a crankcase of an internal combustion engine of a motor vehicle has receded to a slightly sub-normal and predetermined level, said system comprising a rotary twin-way pump in the crankcase of the engine and having its pair of intakes opening at different oil levels in said crankcase, a power-delivering element driven by the engine and connected to and operating said twin-way pump, a transparent sight element mounted in the operator's compartment of the motor vehicle and having an oil passageway therethrough, a pipe line communicating the oil passageway in said transparent sight element with the output of the way of said twin-way pump that has its intake at the higher oil level, a second pipe line communicating the oil passageway in said transparent sight element with the crankcase of the engine so as to return oil circulated through said transparent sight element to said crankcase, and an engine-lubricating conduit connected to the output opening of the way of said twin-way pump that has its intake at the lower oil level.

2. An oil circulation system as defined in claim 1 wherein said pump is composed of a pair of opposed hollow housing pieces and each having an oil intake port and an oil output port communicating with its cavity, a third housing piece separating the cavities of said hollow housing pieces from one another, and a pair of rotary intermeshing gear wheels in each of said cavities and one gear wheel of each pair of gear wheels being fixed to the power-delivering element driven by the engine.

References Cited in the file of this patent

UNITED STATES PATENTS

| | | |
|---|---|---|
| 1,296,148 | Witham | Mar. 4, 1919 |
| 1,587,340 | McCaleb | June 1, 1926 |
| 1,792,754 | Myers | Feb. 17, 1931 |
| 2,141,325 | Werder | Dec. 27, 1938 |
| 2,500,781 | Werder | Mar. 14, 1950 |